017# United States Patent Office 2,854,952
Patented Oct. 7, 1958

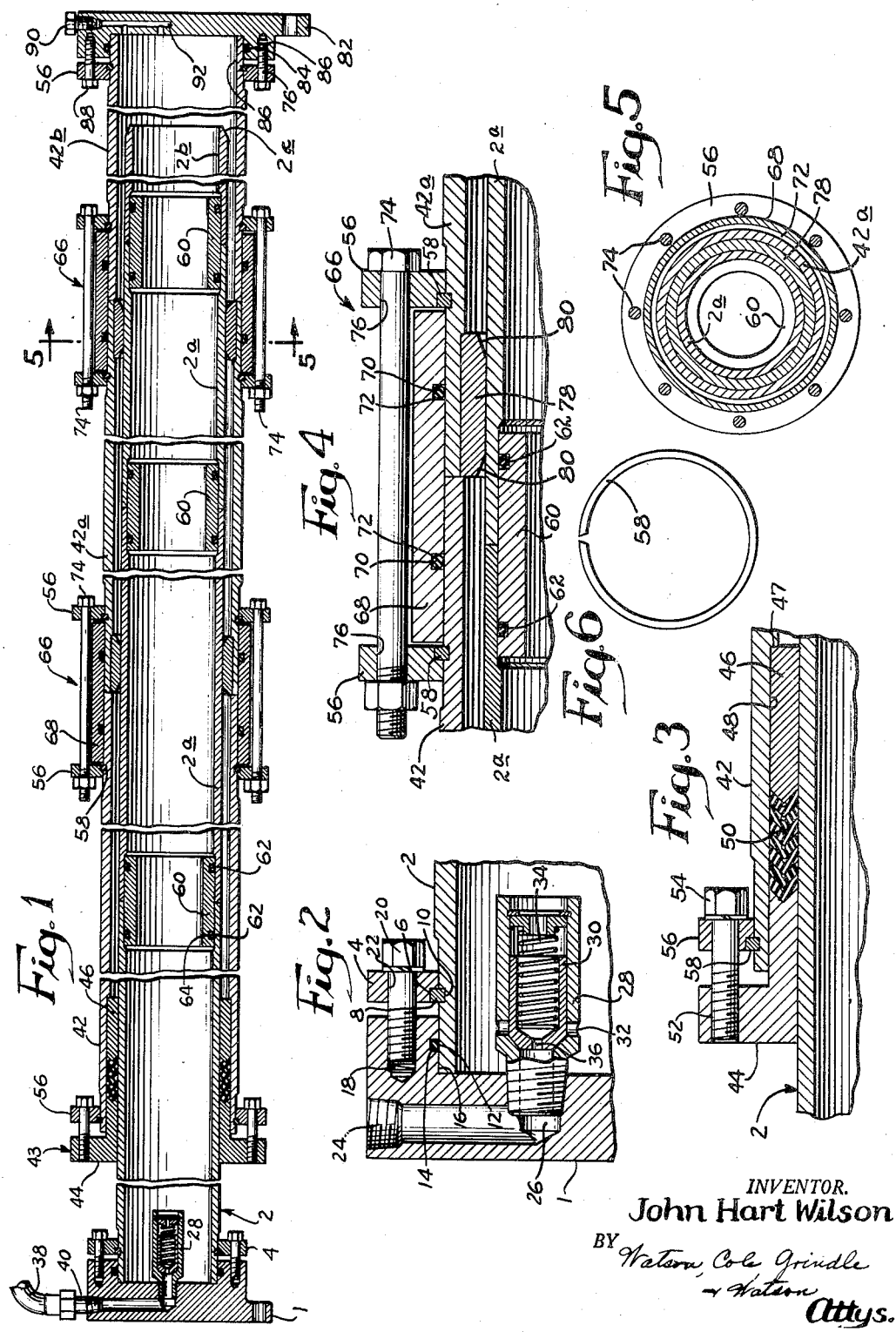

2,854,952
THREADLESS COUPLED, SLENDER RATIO, HYDRAULIC CYLINDER-PLUNGER ASSEMBLY

John Hart Wilson, Wichita Falls, Tex.

Application December 29, 1954, Serial No. 478,449

8 Claims. (Cl. 121—1)

This invention relates to improvements in hydraulic cylinders and more particularly to hydraulic cylinders and plungers which may be attachably assembled together in end to end relation to form a hydraulic plunger and cylinder system of any length, without the use of threaded couplings and wherein the plunger may be supported at spaced intervals so as to insure alignment between the plunger and the cylinder at all times.

Various hydraulic cylinders have been proposed heretofore, but these for the most part were limited to specific applications, in as much as the cylinder and plunger could not be maintained in aligned relation when in all positions, and furthermore, the cylinders did not lend themselves to the repair or replacement of a single section, without dismantling substantially the entire cylinder plunger assembly.

The construction of the present cylinder is such that they may be made in excess of one hundred feet in length and the plunger maintained in parallel spaced relation to the cylinder either in horizontal, angular or vertical position.

An object of this invention is to provide a cylinder-plunger system wherein a series of plungers may be coupled together in end to end relation without the use of threaded couplings.

Another object of this invention is to provide a cylinder-plunger assembly wherein the hydraulic plungers are maintained in spaced, guided, parallel relation to the cylinder throughout the length thereof.

Still another object of the invention is to provide a hydraulic cylinder-plunger assembly connected together by couplings wherein O-ring seals form the necessary sealing relation thereby obviating close tolerance fitting which has heretofore been necessary.

A further object of this invention is to provide a snap ring coupling for the tubular cylinder and plunger end members wherein O-rings are provided to form a sealing relation between the end members and the respective tubular members.

With these objects in mind and others that will manifest themselves as the description proceeds, reference is to be had to the accompanying drawings, in which like reference characters designate like parts in the several views thereof, in which:

Fig. 1 is a longitudinal sectional view through the hydraulic cylinder assembly embodying the invention;

Fig. 2 is a fragmentary, enlarged, longitudinal sectional view showing a portion of the end of the plunger and showing a relief valve in section, and showing the manner of securing the head to the plunger;

Fig. 3 is an enlarged, fragmentary, longitudinal sectional view through a portion of the cylinder and plunger, showing the stuffing gland therebetween, together with the arrangement for adjustably connecting the gland to the cylinder;

Fig. 4 is an enlarged, fragmentary, longitudinal sectional view through the cylinder and plunger, showing the couplings between the respective aligned cylinder sections and the respective aligned plunger sections, and showing the guide member between the cylinder and the plunger;

Fig. 5 is a cross sectional view taken on the line 5—5 of Fig. 1, looking in the direction indicated by the arrows; and Fig. 6 is an elevational view of a snap ring used in connecting the cylinders in aligned relation.

With more detailed reference to the drawing, the numeral 1 designates a plunger end or base member, which is connected to a plunger 2 by means of a coupling, which coupling comprises an annular ring 4 having an annular recess 6 formed therein to receive a snap ring 8, which snap ring seats within annular groove 10 formed near the outer-most end of cylinder-plunger 2. The annular ring 4 is so arranged that it will telescope over the end of plunger 2 until snap ring 8 is expanded over the end and seats within annular groove 10, then the annular ring 4 is moved axially outward until the annular recess telescopes over the snap ring 8 which is seated within annular groove or recess 10.

An O-ring 12 is fitted within an annular recess 14 formed within bore 16 of the end or base member 1, which bore 16 is complementary in size so as to telescope over the end of cylinder-plunger 2 in close fitting relation. The end member 1 has circumferentially spaced holes 18 formed therein which are preferably threaded to receive cap screws 20 therein, which cap screws pass through holes 22 arranged in complementary relation with holes 18. With cap screws threadably engaging the end member 1, the end member assembly is held in tight relation with respect to plunger 2. A passage is provided through end member 1, which passage is intersected by a passage 26 in which a combination relief valve is fitted. The relief valve has a spring pressed slidable valve member 30 therein which will permit full flow of hydraulic fluid through openings 32 when the hydraulic is being pumped into the hydraulic cylinder. However, a spring 34 is positioned against the slidable valve member 30, thereby substantially closing passage 26, when the flow of hydraulic fluid has discontinued, whereupon, the hydraulic fluid is constrained to pass outward through passage 36 when the cylinder is telescoped, thereby retarding the inward movement of the plunger, as would be desirable in many instances.

A hose 38 may be connected by a threaded coupling 40 to the threaded passage 24 in end member 1. The plunger 2 projects into cylinder 42 through a stuffing box designated generally by the numeral 43, which stuffing box has a gland 44 therein. A bearing ring 46 seats on shoulder 47 formed by counterbore 48 within cylinder 42. Packing members, such as shown at 50, are interposed between the outer end of bearing ring 46 and the inner end of gland 44. The gland 44 preferably has circumferentially spaced holes 52 therein, which holes are threaded to receive bolts 54 therethrough.

An annular ring 56 and a snap ring 58 are provided to interengage substantially in the same manner as set out for annular ring 4 and snap ring 8. The annular ring 56 serves as an abutment for bolt 54 to enable the gland 44 to be drawn inward to compress packing 50.

The plunger 2 is connected in end to end relation with plunger sections 2a and 2b. Any number of plunger sections 2a may be fitted in end to end relation by utilizing connector sleeves 60 which are in tight fitting relation with the inner bore of plunger members 2 and 2a, or sections of the plunger 2a may be fitted together in end to end relation to provide a plunger of any desired length, with the end plunger member 2b fitted at the end remote from the base or end member 1. Connector sleeve 60 has a O-ring 62 fitted in annular groove 64 so as to form a fluid tight sealing relation with the inner bore of the respective plunger sections 2 and 2a and 2b, when the adjacent ends of the plungers are fitted together in abutting relation.

The connector sleeves 60 are of sufficient length as to give a rigid aligned joint between the plunger sections 2, 2a, and 2b. The end plunger 2b remote from the end member 1, is tapered as indicated at 2c for the purposes that will be more fully set out hereinafter.

The cylinder is formed of end to end aligned sections 42, 42a, and 42b, with the inner end of cylinder 42 coupled to the adjacent end of a cylinder section 42a or 42b by means of a coupling member 66. Any number of cylinder members 42a may be inserted in end to end relation and in alignment, and coupled together by means of coupling members 66, so as to provide a cylinder of the desired length. The coupling member 66 comprises a pair of annular rings 56 which are adapted to be telescoped over the respective adjacent ends of the sections of the cylinder to be assembled. A snap ring, such as shown at 58, is fitted in annular groove formed in the respective adjacent cylinders, in the same manner as hereinbefore described. The annular rings are moved toward each other until the annular groove therein telescopes over the respective snap ring. A sleeve 68, having O-ring 70 therein is fitted within annular groove 72 to form a fluid tight seal between the sleeve 68 and the outer diameter of the respective cylinder section 42, 42a or 42b.

Circumferentially spaced bolts 74 pass through circumferentially spaced holes 76 in the respective annular rings 56, and the bolts tightened so as to draw the respective ends of the respective cylinder sections 42, 42a and 42b into abutting relation.

The cylinder section 42a is counterbored to receive a bearing member 78, which bearing has an annular bevel 80 at at least one end thereof so as to guide the beveled end 2c of the plunger thereinto. The bearing 78 is preferably made of bearing material, such as bronze or the like, so as to form a bearing for the plunger which is slidable therethrough.

The cylinder section 42b has an end member 82 which is counterbored to receive the end of the cylinder 42b remote from stuffing gland 44. An annular ring 56 is fitted over the end of the cylinder in the same manner as hereinabove set out, and with a snap ring 58 in place, the ring 56 is fixed against outward movement. An O-ring 84 is fitted within the bore 86 so as to form a fluid tight seal between the cylinder section 42b and end member 82. The end member 82 preferably has threaded holes 86 circumferentially spaced therearound to receive cap screws 88 which pass through circumferentially spaced holes 76 in annular ring 56. A vent cock 90 is shown to threadably engage a passage 92 which connects with the interior of cylinder section 42b so as to vent the air therefrom.

Assembly

With the end or base member 1 assembled on plunger 2 in the manner set out above, and with the sleeves 60 arranged to interconnect the successive plunger sections 2, 2a, and 2b, there can be any number of intermediate sections 2a, assembled in end to end abutting relation, and with the sleeve 60 fitted therein in substantially a light press fit, the ends of the plunger members will abut and be secured together so as to form a plunger of any desired length, and the outer joints are so finished as to allow the plunger to pass through the stuffing member and gland in the same manner as would be the case with a unitary plunger.

With the plunger assembled and with the stuffing box, generally designated as 43 arranged as set out above, and with the cylinder 42 telescoped over the plunger and over successive cylinder sections 42a and with bearing members 78 therein telescoped over the plunger and with the cylinder sections coupled together by coupling members 66, a cylinder of any desired length is assembled, whereupon, a cylinder section 52b is connected to a cylinder section 42a by means of a coupling 66 and an end member 82 is connected thereto.

It will be readily apparent that plunger sections 2, 2a and 2b may be standardized in such manner that these can be coupled together in any desired lengths, and the plungers quickly assembled together to fit into a cylinder formed of cylinder sections 42, 42a and 42b, formed into the desired length. Therefore, the necessity of maintaining a large stock of hydraulic cylinder assemblies of various lengths is obviated.

It is to be appreciated that when using the hydraulic cylinder assembly, as illustrated in Fig. 1, such an assembly may be formed of seventy five feet or more in length, for use on a derrick structure, which assembly is transportable in a horizontal, telescoped position, but when on location, the derrick may be erected into vertical position and then the upper section of the cylinder-plunger assembly is moved upward until the hydraulic cylinder is in fully extended position.

Transporting long, slender, hydraulic cylinder-plungers over rough terrain in a horizontal position, when such cylinders are mounted on a mast or the like, without damage to the plunger due to vibration against the internal walls of the cylinder, has presented a problem heretofore. However, in the present instance, the bearing members 78 positioned within the cylinder sections 42, 42a and 42b at spaced intervals, the plunger is secured in supported, aligned relation with respect to the cylinder, thereby preventing lateral movement of the plunger and the damaging of the surface thereof, due to vibratory action in beating against the cylinder walls, as is possible without the plunger being thus supported.

When the mast or the like, in which the hydraulic cylinder is installed, is erected into a vertical position, the plunger, which may be 75' to 100' long, is mounted in a true guided relation, at spaced intervals within cylinders 42, 42a and 42b, by bearings 78, thereby minimizing the wear on the packing element 50 within the stuffing box.

The co-pending application of Thomas M. Rowan, Ser. No. 85,299, for Hydraulic Elevator Devices, which application has been assigned to Wilson Manufacturing Company, of Wichita Falls, Tex., the Wilson of said Wilson Manufacturing Company being the applicant herein, is mentioned to predicate the use of the present hydraulic cylinder assembly for use with extensible masts.

While the invention has been described and illustrated in specific detail, for use on a derrick, it is to be understood that such plunger-cylinder assembly as set forth herein, will lend itself to a wide range of uses, since it is adapted to be used in both the horizontal and in the vertical position. As illustrative of such applications, elevators and jacks are mentioned.

It is also to be understood that while the device has been described and illustrated in one embodiment thereof, changes may be made in the minor details of constructions and adaptations made to different installations without departing from the spirit of the invention or the scope of the appended claims.

Having thus described the invention, what is claimed is:

1. In combination, a cylinder assembly comprising a plurality of hydraulic cylinder sections coupled together in abutting relation in a fluid-tight manner, said cylinder assembly being of high slenderness ratio, which cylinder assembly is assembled so as to be transported in a prone position, at least one of said cylinder sections having an annular recess formed therein near an end thereof, a sleeve bearing formed to provide an internal bore and fitted within said recess so when said cylinder sections are coupled together in abutting relation, said sleeve bearings will be spaced intermediate the length of the assembled hydraulic cylinder, and a plunger adapted to be supported by said sleeve bearing.

2. A hydraulic plunger formed of a multiplicity of tubular members, each adjacent end of said tubular members having a counterbore formed therein, a sleeve of such diameter as to be in tight fitting relation within the respective counterbores of said tubular members when said tubular members are fitted thereon, which sleeve is of a length less than the combined length of two adjacent counterbores so when adjacent ends of said tubular members are abutted together said sleeve will extend into each of said tubular members a distance of approximately one-half the length of the sleeve.

3. In a hydraulic plunger assembly as defined in claim 2, wherein said sleeve has at least one exterior annular groove formed intermediate the end of said sleeve and the normal juncture of said tubular members when fitted on said sleeve, and wherein an O-ring sealing element is disposed in each of said grooves in said sleeve.

4. In a hydraulic cylinder-plunger assembly of high slenderness ratio, a multiplicity of tubular members abutted in end to end relation, means joining said tubular members in end to end axially aligned relation to form an elongated cylinder, said tubular members intermediate the end members each having at least one counterbore formed therein adjacent the abutting ends of said members, a sleeve bearing fitted within each of said counterbores, said sleeve bearings each having a bore formed therein, and an elongated, high slenderness ratio plunger fitted within said cylinder in sliding relation with said sleeve bearings so as to support said plunger in axially aligned relation with respect to said cylinder.

5. Substantially as set forth in claim 1; wherein at least one end of said internal bore of said sleeve bearing is beveled.

6. In a hydraulic cylinder and plunger assembly connected together so said hydraulic cylinder and plunger will each be formed of a plurality of sections joined in end to end relation without said plunger or cylinder sections having screw threads thereon, comprising end members joined to the respective cylinder and plunger by annular rings having grooves formed therein engaging a substantially annular snap ring fitted within a groove formed within the respective cylinder sections near each end thereof, bolt means for securing said annular ring to said end member, sealing means between the respective end member and cylinder member for sealing said respective members in fluid tight relation, at least one cylinder coupling to couple adjacent ends of said cylinders, said coupling comprising a pair of annular rings fitted around each of said cylinder sections and each having an annular groove formed therein and connected with said bore on adjacent sides, a groove formed within said cylinder sections a spaced distance outward from each adjacent end, a sealing sleeve telescoped over adjacent ends of said cylindrical sections and forming a fluid tight seal therebetween, connecting bolts interengaging said annular rings and drawing said annular rings inward into contact relation with said substantially annular snap rings, a plunger guide ring secured interior of at least one of said cylinders near an end thereof and in bearing relation with said plunger, said plunger sections each having a counterbore formed adjacent ends thereof, a sleeve adapted to telescope into said counterbores in each of said cylindrical plungers so said plunger ends will abut, sealing means between said sleeve and said respective plunger sections so as to form a fluid tight seal, and a stuffing gland between said plunger and said hydraulic cylinder so as to form a fluid tight seal therebetween.

7. The device as defined in claim 2, wherein a fluid sealing means is provided between the outer diameter of said sleeve and the inner diameter of each said tubular member.

8. A hydraulic jack comprising a plurality of cylindrical members, a sleeve surrounding adjacent ends of said cylindrical members, sealing means surrounding each of said respective cylindrical members adjacent the end thereof and being fitted within said sleeve surrounding adjacent ends of said cylindrical members so as to form a fluid tight seal between said sleeve and said cylindrical members, rings surrounding said cylindrical members and engageable therewith, bolt means passing through said rings to hold adjacent ends of said cylindrical members in abutting relation, a multi-section tubular member fitted within said tubular member, a sleeve fitted within adjacent ends of said multi-sections of said tubular member in tight fitting relation, sealing means between the outer diameter of each said sleeve and the inner diameter of each of said multi-section tubular members so as to form a fluid tight seal between adjacent ends of said sleeve fitted therein, one end of said cylindrical member being closed and the other end thereof having a gland fitted intermediate said cylindrical member and said multi-section tubular member so as to form a fluid tight seal therebetween, and a fluid conduit connected to the interior of said multi-section tubular member.

References Cited in the file of this patent

UNITED STATES PATENTS

| | | |
|---|---|---|
| 1,288,631 | McFarland | Dec. 24, 1918 |
| 1,703,696 | Stratford | Feb. 26, 1929 |
| 1,824,422 | Badger | Sept. 22, 1931 |
| 2,346,051 | Seamark | Apr. 4, 1944 |
| 2,403,364 | Hertzell | July 2, 1946 |
| 2,444,380 | Shimek | June 28, 1948 |
| 2,459,956 | Muller | Jan. 25, 1949 |
| 2,535,694 | Payne | Dec. 26, 1950 |

FOREIGN PATENTS

| | | |
|---|---|---|
| 519,194 | Germany | Feb. 5, 1931 |
| 532,985 | Great Britain | Feb. 4, 1941 |